US007320295B2

(12) United States Patent
Ehrreich

(10) Patent No.: US 7,320,295 B2
(45) Date of Patent: Jan. 22, 2008

(54) SQUIRREL HOUSE WITH PREDATOR PROTECTION

(76) Inventor: John E. Ehrreich, 31 Ross La., Marstons Mills, MA (US) 02648

(*) Notice: Subject to any disclaimer, the term of this patent is extended or adjusted under 35 U.S.C. 154(b) by 0 days.

(21) Appl. No.: 11/441,762

(22) Filed: May 27, 2006

(65) Prior Publication Data

US 2006/0272592 A1   Dec. 7, 2006

Related U.S. Application Data

(63) Continuation-in-part of application No. 10/778,406, filed on Feb. 14, 2004, now Pat. No. 7,069,877.

(51) Int. Cl.
    *A01K 1/00*     (2006.01)
    *A01K 31/14*    (2006.01)
(52) U.S. Cl. ..................... 119/485; 119/428
(58) Field of Classification Search ............. 119/485, 119/28.5, 57.9, 61.57, 430, 416, 433, 434, 119/429, 435, 428; D30/108, 113, 110
    See application file for complete search history.

(56) References Cited

U.S. PATENT DOCUMENTS

| 3,130,706 | A | * | 4/1964 | Myaida et al. | 119/428 |
| 3,643,631 | A | * | 2/1972 | Wade et al. | 119/434 |
| 4,235,196 | A | * | 11/1980 | Moliterni | 119/464 |
| 4,291,645 | A | * | 9/1981 | Cruchelow et al. | 119/484 |
| 4,614,166 | A | * | 9/1986 | Maurice | 119/306 |
| 4,942,845 | A | * | 7/1990 | Lane | 119/52.2 |
| 5,050,536 | A | * | 9/1991 | Baker | 119/499 |
| 5,165,366 | A | * | 11/1992 | Harvey | 119/165 |
| 5,167,099 | A | * | 12/1992 | Nelson | 52/101 |
| D349,366 | S | * | 8/1994 | Kuhn et al. | D30/108 |
| 5,445,109 | A | * | 8/1995 | Gray et al. | 119/57.9 |
| 5,746,156 | A | * | 5/1998 | Petrides et al. | 119/428 |
| 5,964,189 | A | * | 10/1999 | Northrop et al. | 119/482 |
| 5,975,017 | A | * | 11/1999 | Cameron | 119/165 |
| 6,334,407 | B1 | * | 1/2002 | Schneider | 119/51.01 |
| 6,360,689 | B1 | * | 3/2002 | Weinert | 119/51.01 |
| 6,460,485 | B1 | * | 10/2002 | Burg | 119/431 |
| 6,477,983 | B1 | * | 11/2002 | Bette | 119/428 |
| 6,481,375 | B1 | * | 11/2002 | Scalf | 119/52.2 |
| 6,604,488 | B2 | * | 8/2003 | Heinzeroth et al. | 119/61.57 |
| 7,243,465 | B2 | * | 7/2007 | Donoho | 52/101 |

* cited by examiner

*Primary Examiner*—Yvonne R. Abbott

(57) ABSTRACT

A squirrel house that can be used for shelter from predators, from cold weather and for providing a den for a breeding pair of squirrels to build a nest for raising a family of young squirrels, having a front wall including a side access hole, a floor having a bottom access opening, a pair of matching side walls supporting a shed roof end extending at a slight incline from the back wall to and over the side access wall being supported along the tapered top edges of the side walls. The squirrel house also employs multiple predator guards including a predator guard mounted on the roof, an internal predator guard, an interior baffle to reduce access by a predator, and a roof guard comprising projections on the roof to hinder predator access from the roof, and where there is a separate exit hole for the nesting squirrel(s) to exit while a predator attempts to enter through a predator guard hole.

3 Claims, 4 Drawing Sheets

SQUIRREL HOUSE WITH PREDATOR PROTECTION

CROSS REFERENCE TO PRIOR APPLICATION

This application is a continuation-in-part of U.S. patent application Ser. No. 10/778,406, entitled SQUIRREL HOUSE filed on Feb. 14, 2004, now U.S. Pat. No. 7,069,877, of John Ehrreich, which is incorporated herein by reference in its entirety.

In the parent application, Ser. No. 10/778,406 entitled SQUIRREL HOUSE the invention relates to squirrel house comprising an enclosure having a floor configured to support a nest to accommodate a squirrel, wherein the floor includes a first bottom access opening; a side wall having a second access opening with attaching means comprising a back-attaching component connected to the back of the squirrel house, and a bottom support component for the squirrel house; wherein the bottom support comprises a metallic angle bracket with variable positioning to associate closely with a curved tree trunk and to support the squirrel house.

The current application the invention is clarified as being directed an artificial squirrel house having predator protection to be securely attached to a tree at an elevation of at least 10 feet. The predator protection provided in this artificial squirrel house comprises a first access hole and a second access hole to allow a within-contained squirrel to escape from the house via an open access hole if a foreign animal attempts to enter the other access hole. Also, the squirrel house of the present invention allows a squirrel to enter directly into the house from an adjacent tree trunk below, and a side access hole defines an opening for admitting squirrels from the roof, wherein said openings may also offer exit at such time as the other access is blocked by a predator. Also a baffle is provided inside and adjacent the bottom access hole to prevent easy access by a foreign animal and to prevent baby squirrels from falling out of the house.

BACKGROUND ART

Applicant is aware of prior animal/bird houses having holes for access arrangements. For example U.S. Pat. No. 3,643,631; Wade et al shows a double walled, insulated bird house comprising a back wall (18) that possesses an attaching mechanism (14); a second (16) having an access opening (32); two additional walls (20), a roof (40); a floor (84) comprising bottom access openings; a bottom support component (14') comprising a metallic angle bracket which allows the house to be attached to an elevated surface such as a tree trunk at various positions; wherein the floor is configured such that it is capable of supporting a nest, and wherein the access holes in the floor allow for drainage from rain or melted snow. However Wade et al fails to disclose predator protection suitable for squirrels by providing a first access hole and a second access hole to allow a within-contained squirrel to escape from the house via an open access hole if a foreign animal attempts to enter the other access hole U.S. Pat. No. 6,477,983 to Bette to shows a bird house with deployable fledging board comprising a back wall (10) that possesses top and bottom support attaching mechanisms (24) which are capable of attaching the housing to an elevated surface; a second wall (12) having an access opening (16); two additional walls (18, 22); a roof (11) having a low front end and a high back end and being supported along tapered top edges of the side walls; a floor (26) comprising bottom access opening (31) capable of allowing drainage from rain/or snow; wherein the floor is configured such that it is capable of supporting a nest; and wherein the walls of the housing may be made of plywood (col. 2, lines 37-42). However Bette fails to disclose predator protection suitable for squirrels by providing a first access hole and a second access hole to allow a within-contained squirrel to escape from the house via an open access hole if a foreign animal attempts to enter the other access hole U.S. Pat. No. 5,050,536 to BAKER discloses an animal playhouse suitable as a playhouse for cats including a housing having panels that are formed in a one-piece construction and that are movable relative to each other to a closed collapsed position, whereby the housing is conveniently stored or shipped, a plurality of interior deck members being located within the housing to define a plurality of spaced interior compartments, openings being formed in the vertical panels which communicate with the interior compartments to provide access thereto for a cat, and a locking construction for retaining the vertical panels in the open erected position.

U.S. Pat. No. 5,975,017 to Cameron shows a exterior mounted housing for animal litter box. In particular to a housing mounted on the exterior side of a dwelling having a storage compartment for removeably holding a litter box. A hollow open-ended tunnel interconnects the interiors of the dwelling and housing respectively. The tunnel is rigid in a cantilevered position. A pivotal door in the side of the housing or enclosure permits access for insertion or removal of the litter box. A platform panel with a central hole separates a lower compartment of the litter box from an upper compartment.

It is noted that Cameron fails to teach predator guards including a predator guard mounted on the roof, an internal predator guard, an interior baffle to reduce access by a predator, and a roof guard comprising projections on the roof to hinder predator access from the roof, and where there is a separate exit hole for the nesting squirrel(s) to exit while a predator attempts to enter through a predator guard hole. Further, a major disadvantage of Baker's type of cat playhouse is that it is ill adapted for use when attached on a tree at an elevation of 10 feet. Furthermore the panels of the cathouse are not intended to be weather proof nor does it provide for predator guards including a predator guard mounted on the roof, an internal predator guard, an interior baffle to reduce access by a predator, and a roof guard comprising projections on the roof to hinder predator access from the roof, and where there is a separate exit hole for the nesting squirrel(s) to exit while a predator attempts to enter through a predator guard hole.

Applicant submits that the prior art fails to teach multiple predator guards including a predator guard mounted on the roof, an internal predator guard, an interior baffle to reduce access by a predator, and a roof guard comprising projections on the roof to hinder predator access from the roof, and where there is a separate exit hole for the nesting squirrel(s) to exit while a predator attempts to enter through a predator guard hole.

BACKGROUND OF THE INVENTION

Squirrels, such as gray squirrels, have in the past been dependent on natural tree cavities or leaf nests in trees for sites for nesting as well as winter dens providing shelter. Inasmuch as natural forest areas with mature trees including such shelter have been greatly reduced, there is a need for a substitute artificial squirrel house for use as a den. The desired configuration of an artificial squirrel house should provide a light weight den for a breeding pair of squirrels, such as gray squirrels, and raising a family of young squirrels. Also the nest needs protection from predators along with an alternative exit. In particular such protection should provide ease of exit. The need to provide protection from predators is directed to red foxes, weasels, martins, minks, eagles and raptors. Nestling and young squirrels should also be protected from raccoons, opossums, cats and rat snakes.

A review of the prior art has failed to satisfy the requirements for multiple predator guards including a predator guard mounted on the roof, an internal predator guard, an interior baffle to reduce access by a predator, and a roof guard comprising projections on the roof to hinder predator access from the roof, and where there is a separate exit hole for the nesting squirrel(s) to exit while a predator attempts to enter through a predator guard hole. The predator protection provided in this artificial squirrel house comprises a first access hole and a second access hole to allow a within-contained squirrel to escape from the house via an open access hole if a foreign animal attempts to enter the other access hole. The squirrel house of the present invention allows a squirrel to enter directly into the house from an adjacent tree trunk below, and a side access hole defines an opening for admitting squirrels from the roof, wherein said openings may also offer exit at such time as the other access is blocked by a predator. Also a baffle is provided inside and adjacent the bottom access hole to prevent easy access by a foreign animal and to prevent baby squirrels from falling out of the house associate closely with selected curved tree trunk employed for bottom support and provides the solution to ease of attachment to a curved tree trunk member.

SUMMARY OF THE INVENTION

The present invention is directed to an apparatus for addressing the need for an artificial squirrel house for shelter from predators, from cold weather and for providing a den for a breeding pair of squirrels to build a nest for raising a family of young squirrels.

The present invention disclosed herein is designed for ready use by a variety of squirrels species so that it may serve as a squirrel house in which such squirrels may build a nest. The squirrel house of the present invention may selectively be adapted by various kinds of squirrels, as they may change the size of the access holes by which squirrels may enter or exit the house. Such species could include red squirrels, gray squirrels, flying squirrels, and fox squirrels. Placement of such an artificial squirrel house in the form of a box, preferably should be attached to a tree and be placed at least 10 feet above the ground and be facing away from the prevailing winds. A living tree is preferred over dead trees to avoid the risk of having the tree blown down as is especially common with dead trees.

In the preferred embodiment of the present invention the squirrel house incorporates a thin-walled structure and employs multiple predator guards. The elements of structure of the squirrel house include a roof, four side walls with one of these walls having an access opening and another side wall including an attachment bracket. The house also includes a floor having a bottom access opening, said floor extending horizontally between said front wall and back wall arranged in orthogonal relationship thereto. Other structural members include a pair of matching side walls each having a a tapered top edge, and a shed roof extending at a slight incline from the back wall to and over the side access wall being supported along the tapered top edges of the side walls.

Additional elements of the squirrel house may include a laterally extending space for ventilation between the bottom of the shed roof and the top of the front wall; a reinforcing cleat with mounting fasteners extending across the attachment extension member in a horizontal plane and a L bracket providing bottom support attached to the bottom of the floor arranged perpendicular thereto. In particular and of critical importance, the "L" bracket may comprise a metallic angle support member of malleable construction with variable positioning to associate closely with selected curved tree trunk employed for bottom support.

As is shown in FIG. 11, use of spikes on the roof is employed as a predator guard for prevention of roosting by predators. The spikes located on the lateral surface of the roof comprise numerous prongs consisting of sharp points at one end and heads at the opposite end and are intended for preventing a predator/raptor from alighting and perching thereon. The prongs are arranged to project from the roof such that when a raptor does alight and perch thereon, said prongs render the perching to be so uncomfortable as to a) incur prompt departure and b) render subsequent return attempt most unlikely.

As is shown in FIG. 12, use of a baffle is provided inside and adjacent the bottom access hole to prevent easy access by a foreign animal and to prevent baby squirrels from falling out of the house.

Accordingly it is an object of the present invention to provide a squirrel house with predator guards including a predator guard mounted on the roof, an internal predator guard, an interior baffle to reduce access by a predator, and a roof guard comprising projections on the roof to hinder predator access from the roof, and where there is-a separate exit hole for the nesting squirrel(s) to exit while a predator attempts to enter through a predator guard hole.

Another object of the present invention to provide a squirrel house with dual, spaced apart access openings.

Another object is to provide a squirrel house with baffle members in association with at least one access opening to prevent easy access by a foreign animal and to prevent baby squirrels from falling out of the house.

It is another object is to provide a metallic angular support member with variable positioning capability to associate closely with a selected curved tree trunk to be employed for bottom support.

It is another object is to provide a squirrel house of sturdy, thin-wall construction for secure support of a family of squirrels.

The invention will be described for the purposes of illustration only in connection with certain embodiments; however, it is recognized that those persons skilled in the art may make various changes, modifications, improvements and additions on the illustrated embodiments all without departing from the spirit and scope of the invention.

BRIEF DESCRIPTION OF THE DRAWINGS

For a better understanding of the present invention, reference may be had to the following detailed description taken in conjunction with the accompanying drawings in which.

DETAILED DESCRIPTION OF THE PREFERRED EMBODIMENT

Figure 1:
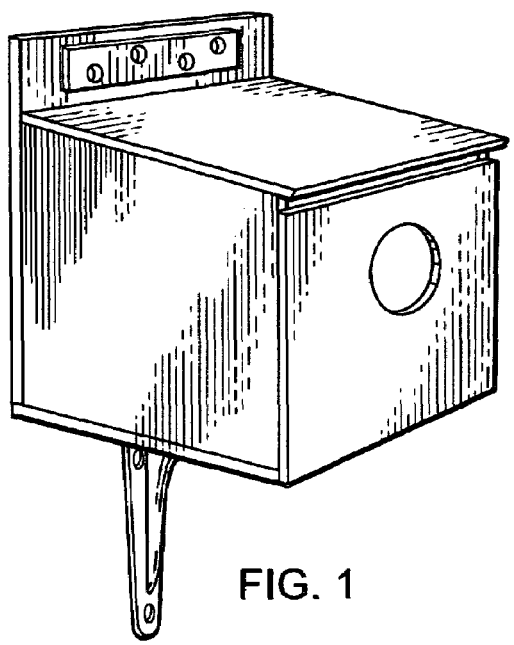
FIG. 1 is a perspective view of an assembled squirrel house in accordance with the present invention.

Referring now to the FIGS. 1-12, there is shown the preferred embodiment of a squirrel house 10 in accordance with the present invention. In particular, referring now to the FIG. 1, there is shown a perspective view of the preferred embodiment of a squirrel house 10 having structural members of thin-wall construction constructed of materials made to withstand outdoor inclement weather, including a front wall 12, having an access opening 14, a back wall 16, and a attachment extension member 20. An additional structural member comprises a floor 22 of thin-wall construction having a bottom access opening 24 that defines the bottom of the said squirrel house 10. Said floor 22 extends horizontally between said front wall 12 and back wall 16 arranged in orthogonal relationship thereto. The floor is configured to support a nest, not shown, to accommodate a family of squirrels and the bottom access opening 24 in floor 22 allows for drainage of rain water to keep the nest dry.

Figure 4:
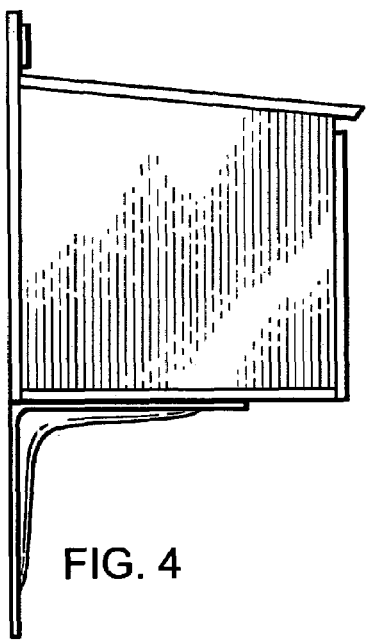
FIG. 4 is a side view of the squirrel house of FIG. 1.
Figure 5:
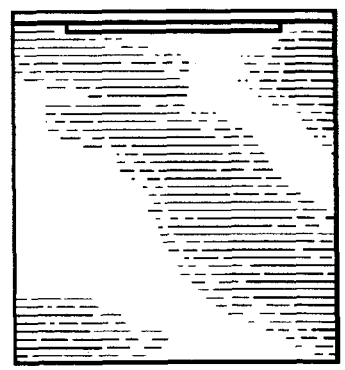
FIG. 5 is a top view of the squirrel house of FIG. 1, showing a plan view of the roof.
Figure 6:
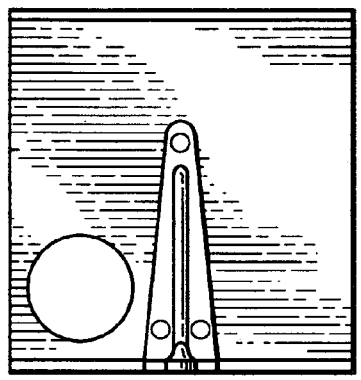
FIG. 6 is a bottom view of the squirrel house of FIG. 1, showing a plan view of the floor with bottom access.

Additional structural members include a pair of matching side wall members 26 and 28, also of thin-wall construction, extending vertically there-between each having a tapered top edge. As is shown in FIG. 4, shed roof 32 is shown with a slight incline for drainage purposes. More particularly, said shed roof 32 is shown with a low front end and a high back end extending at a slight incline from the back wall 16 to and over the front wall 12, being supported along the tapered top edges of the side walls 26 & 28.

Figure 2:
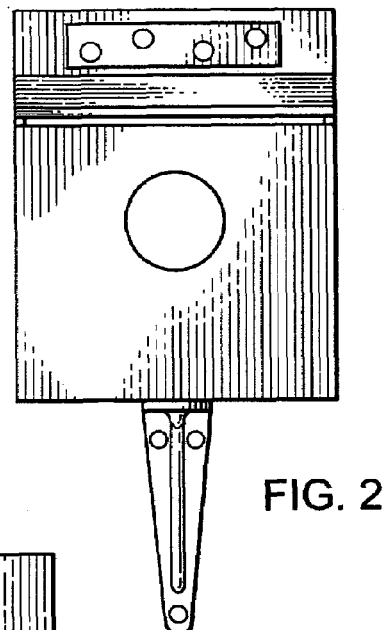
FIG. 2 is a front view of the squirrel house of FIG. 1 in accordance with the present invention.
Figure 3:
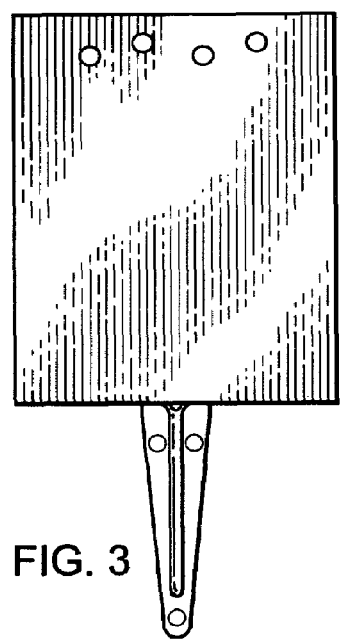
FIG. 3 is a rear view of the squirrel house of FIG. 1.

Referring to FIGS. 1, 2 and 4 there is shown a laterally extending space for permitting ventilation between the bottom of the shed roof 32 and the top of the front wall 12.

Figure 8:
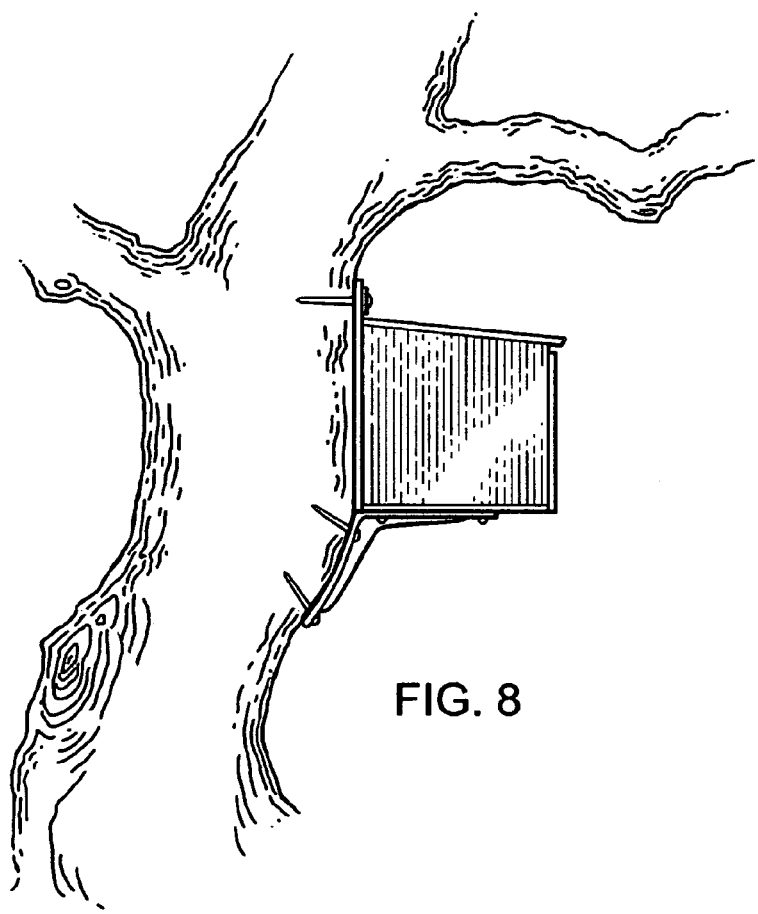
FIG. 8 is a side view of the squirrel house of FIG. 1; shown attached to a tree with the attachment extension member adjusted for mounting said house on the tree.
Figure 9:
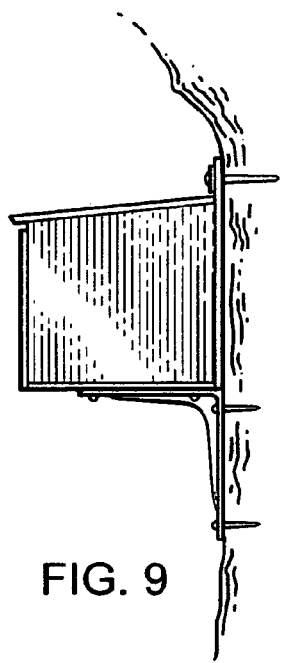
FIG. 9 is a side view of the squirrel house of FIG. 1; shown attached to a tree with the attachment extension member without adjustment.

Referring to FIGS. 1 and 2, there is also shown a reinforcing cleat 38 with a series of openings 40 associated with mounting fasteners 42, extending across the attachment extension member 20 in a horizontal plane. Said cleat provides for top mounting of squirrel house 10 on a tree trunk 44 is shown in FIGS. 1, 8 and 9, As is shown in FIGS. 1, 7, 8 and 9, "L" shaped bracket 46, that is directed to providing bottom support of squirrel house 10, is shown attached to the bottom of the floor 22, is arranged perpendicular thereto. "L" shaped bracket 46 comprises a metallic right angle support member for squirrel house 10 and is of malleable construction with variable positioning to associate closely with a selected curved tree trunk 44. The "L" shaped bracket 46 not only supports the weight of the house but supports a family of gray squirrels as well.

Figure 10:
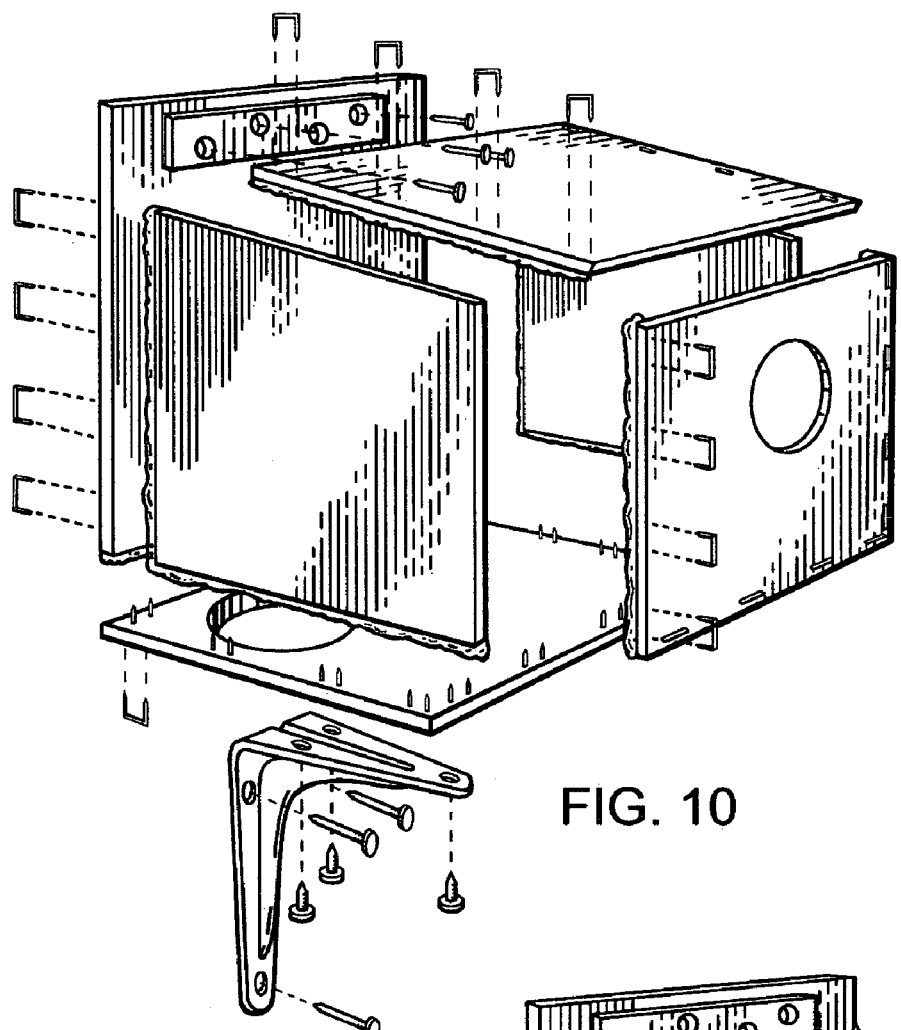
FIG. 10 is an exploded perspective view of the squirrel house of FIG. 1, in accordance with the present invention showing use of adhesive and staples as a means of fastening structural member together.

There is shown in FIG. 10 an exploded perspective view of squirrel house 10 shown in FIG. 1, showing use of adhesive 48 in combination with staples 50 wherein said staples are employed as a means of holding structural members together in place while the adhesive is drying and/or curing. Said structural members include front wall 12, back wall 16, floor 22 and shed roof 32, that comprise panels of light-weight wood comprising ¼" exterior plywood to provide a lightweight construction.

Figure 7:
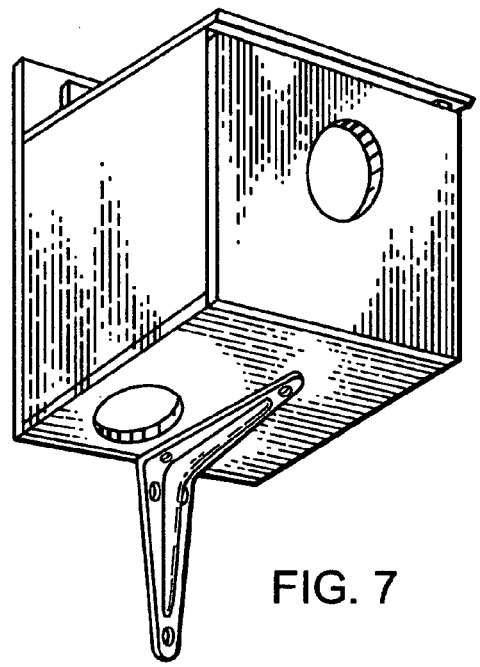
FIG. 7 is a perspective view from below of the squirrel house of FIG. 1, showing a the two access opening providing side access/egress as well as bottom access/egress.

As is shown in FIG. 7, bottom access opening 24 in the floor 22 of squirrel house 10 allows for bottom access for a squirrel to squirrel house 10 as well as permitting drainage of rain water. Also as is shown in FIG. 7 a critical feature of squirrel house 10 is shown in that said squirrel house 10 comprises a first and second access opening for squirrels, i.e. access opening 14 on front wall 12, and bottom access opening 24 in floor 22. This feature permits a squirrel to escape from said house via the second hole if a foreign animal attempts to enter said first hole. Furthermore, bottom access opening 24 also allows a squirrel to enter directly into squirrel house 10 from an adjacent tree trunk 44, as is shown in FIG. 8, from below. Also access hole 14 defines an opening for admitting squirrels from the shed roof 32 shown in FIG. 7. From this it can be seen that said first or second openings may also offer exit at such time as the other access is blocked by a predator.

Also, as is shown in FIG. 8, "L" bracket 46 comprises a metallic angular support member of malleable construction with variable positioning to associate closely with selected curved tree trunk 44 employed for bottom support of house 10. The squirrel house 10 wherein "L" bracket 46 supports the weight of the house 10 as well as a family of gray squirrels.

Figure 11:
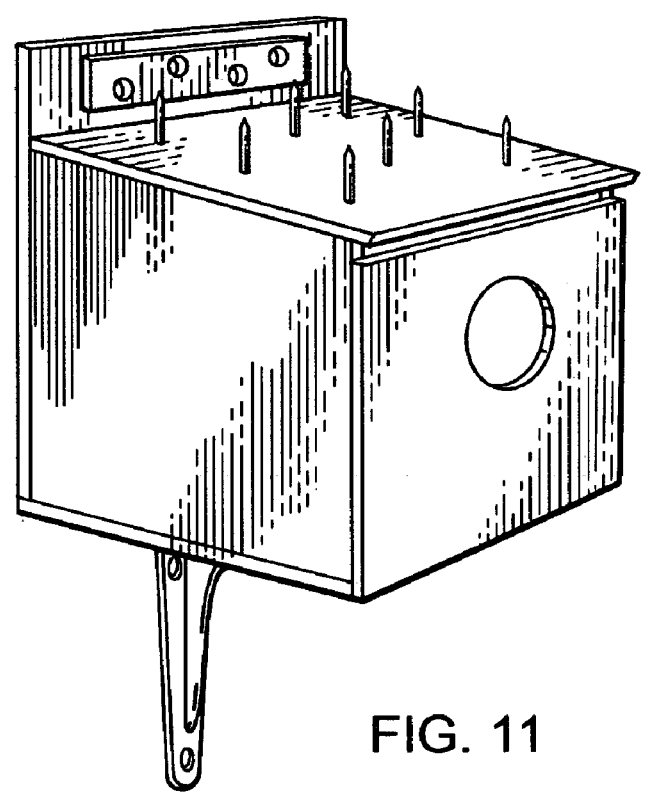
FIG. 11 is a perspective view of the squirrel house of FIG. 1, showing use of spikes as a roosting guard for prevention of access by predators.

As is shown in FIG. 11 the shed roof 32 shows use of a predator guard 54 for prevention of roosting by predators/raptors. The predator guard 54 is located on the lateral surface of the shed roof 32 and consist of numerous prongs 56 consisting of sharp points 58 at one end and head at the opposite end. Said prongs 56 and are intended for preventing a predator/raptor from alighting and perching thereon. The prongs 56 are arranged to project from the shed roof 32 such that when a raptor, not shown, does alight and perch thereon, said prongs 56 render the perching to be so uncomfortable as to a) incur prompt departure and b) render subsequent return attempt most unlikely.

Figure 12:
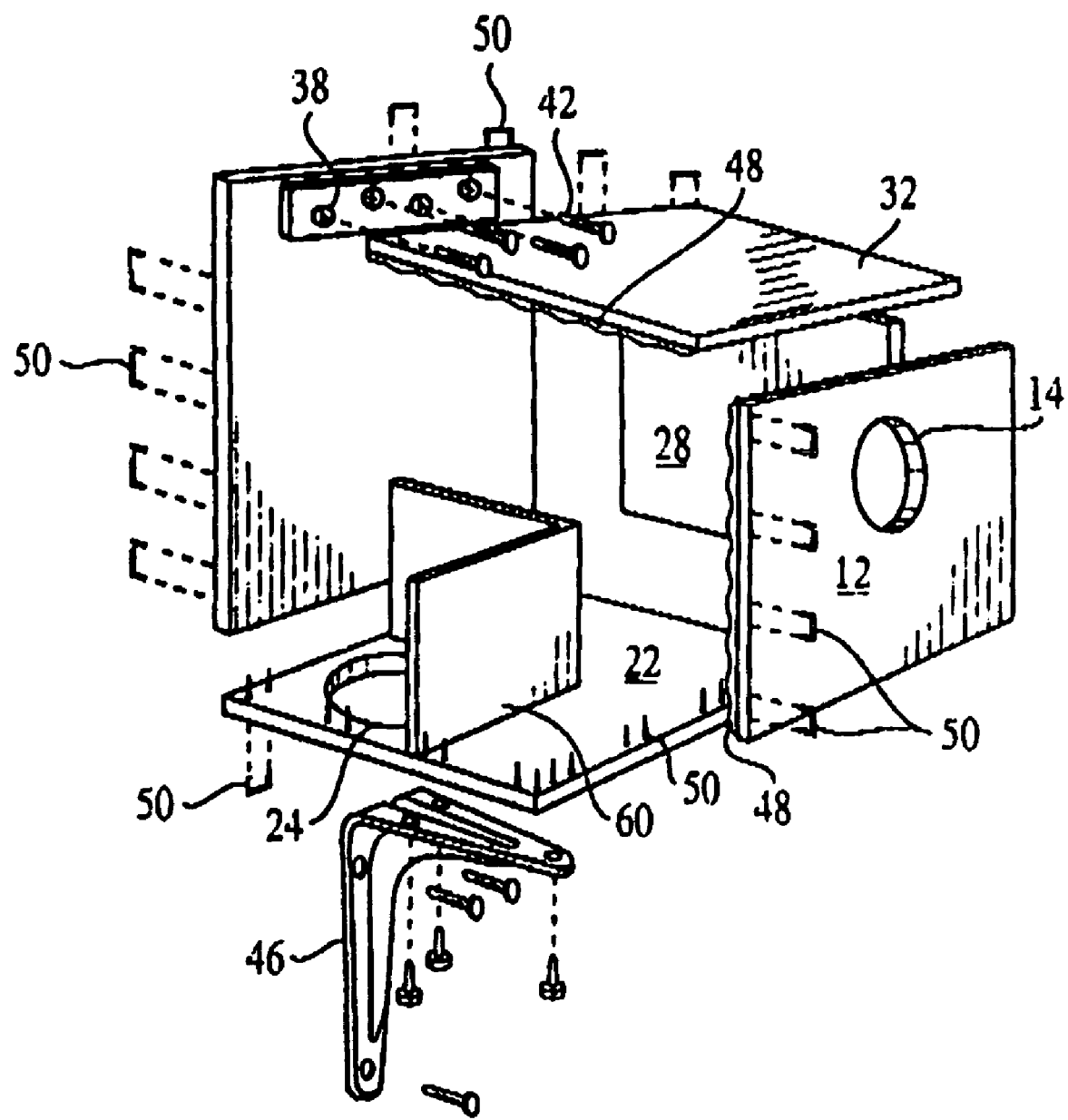
FIG. 12 is an exploded perspective view of the squirrel house of FIG. 1, showing a baffle provided inside and adjacent the bottom access hole.

As is shown in FIG. 12, squirrel house 10 includes a baffle 60 positioned inside and adjacent bottom access hole 24 to prevent easy entrance access by a foreign animal, as well as to prevent baby squirrels from falling out of said house 10. Said baffle 60 comprises two partition walls joined in orthogonal relation and arranged in perpendicular relationship to floor 22. Said partition walls are constructed of light-weight wood comprising ¼" exterior plywood, fastened to floor 22 by use of adhesive 48 and staples 50 as a means of fastening structural members together while the adhesive is drying and/or curing.

What is claimed is:

1. A squirrel house on a tree comprising: a) projections on a roof to hinder predator access from the roof; b) an interior baffle to reduce access by a predator; c) and a separate exit opening for the nesting squirrel(s) to exit while the predator attempts to enter through an access opening.

2. A squirrel house of claim 1 wherein the house is attached by a dual attaching means.

3. A squirrel house on a tree comprising: a) attachment by a dual attaching means; b) projections on a roof to hinder predator access from the roof; c) and a separate exit opening for the nesting squirrel(s) to exit while the predator attempts to enter through an access opening.

* * * * *